United States Patent
Tyan et al.

(10) Patent No.: US 6,941,042 B2
(45) Date of Patent: Sep. 6, 2005

(54) HIGH-EFFICIENCY ARRAYED-WAVEGUIDE GRATING ROUTER BY WAVEFRONT FORMATION

(75) Inventors: Rongchung Tyan, Irvine, CA (US); Dmitri E. Nikonov, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 630 days.

(21) Appl. No.: 09/860,346

(22) Filed: May 18, 2001

(65) Prior Publication Data

US 2002/0172460 A1 Nov. 21, 2002

(51) Int. Cl.[7] .................................................. G02B 6/34
(52) U.S. Cl. ........................................... 385/37; 385/39
(58) Field of Search ........................... 385/37, 39, 42, 385/40, 46, 129, 130, 131

(56) References Cited

U.S. PATENT DOCUMENTS

| | | | |
|---|---|---|---|
| 4,722,089 A | * 1/1988 | Botez et al. | .......... 372/50 |
| 5,745,618 A | 4/1998 | Li | |
| 6,301,409 B1 | 10/2001 | Whiteaway et al. | |
| 6,374,013 B1 | 4/2002 | Whiteaway et al. | |
| 6,442,308 B1 | 8/2002 | Han et al. | |
| 6,442,311 B1 | 8/2002 | Barbarossa et al. | |

FOREIGN PATENT DOCUMENTS

| | | | |
|---|---|---|---|
| DE | 19846573 A1 | * 4/2000 | ............. G01J/3/45 |
| EP | 0 881 512 A2 | 12/1998 | |
| EP | 0 984 304 A2 | 3/2000 | |
| WO | PCT US02/14875 | 3/2003 | |
| WO | PCT/US02/14875 | 3/2004 | |

OTHER PUBLICATIONS

Maru, K., et al., "Low–Loss Arrayed–Waveguide Grating With High Index Regions At Slab–To–Array Interface," Electronics Letters, vol. 37, No. 21, (Oct. 11, 2001).

Dragone, C., "Optimum Design of a Planar Array of Tapered Waveguides," *Journal of the Optical Society of America*, (Nov. 7, 1990), No. 11, Woodbury, NY, US, pp. 2081–2093.

* cited by examiner

*Primary Examiner*—Frank G. Font
*Assistant Examiner*—K. Cyrus Kianni
(74) *Attorney, Agent, or Firm*—Blakely, Sokoloff, Taylor & Zafman LLP

(57) ABSTRACT

Interface loss, diffraction loss, and physical sizes of arrayed-waveguide (AWG) devices, such as AWG routers, are reduced via use of an array of asymmetric waveguide couplers that is inserted between arrayed waveguides. The asymmetric waveguide couplers operate to couple leaked optical power back to the arrayed waveguides. A lenslet matrix may also be used to pre-channel portions of an optical wavefront. The lenslet matrix includes lenslet columns that are aligned with gaps between the arrayed waveguides, such that the portions of the optical wavefront are directed towards the arrayed waveguides rather than towards the gaps.

24 Claims, 2 Drawing Sheets

HIGH-EFFICIENCY ARRAYED-WAVEGUIDE GRATING ROUTER BY WAVEFRONT FORMATION

TECHNICAL FIELD

This disclosure relates generally to optical waveguide devices, and in particular but not exclusively, relates to arrayed-waveguide grating (AWG) devices, such as AWG routers, having a lenslet matrix or asymmetric waveguide couplers.

BACKGROUND

An arrayed-waveguide grating (AWG) router as an optical multiplexer/demultiplexer (MUX/DEMUX) is a commonly used device in a dense wavelength division multiplexing (DWDM) network. For high-channel count (e.g., greater than 16 channels) MUX/DEMUX applications, AWG devices can generally perform in a satisfactory manner technologically and economically.

An AWG device typically includes a pair of star couplers (at the input and output) and a waveguide array. In conventional AWG designs, due to limitations of standard fabrication techniques for planar lightwave circuits (PLCs) that make formation of infinitely sharp corners/edges difficult, gaps are formed between waveguides. These gaps are present at an interface between a slab waveguide portion of a star coupler and the waveguide array. Widths of these gaps are determined by a maximum aspect ratio associated with, and also limited by, a particular etching and deposition/re-flow process.

When an optical wavefront propagates through the interface, a portion of the power of the optical wavefront is scattered by the gaps into areas between arrayed waveguides. This causes some of the propagating optical wave(s) to become unguided. Scattering loss at the interface is one of the major losses of an AWG device. The gaps also increase diffraction loss at the output star coupler, where more power is transferred to undesirable diffraction orders.

A current method to reduce these losses is to design AWG devices where the gap width between arrayed waveguides is decreased. However, to fabricate such AWG devices, a significantly better etching process and a longer cladding deposition/re-flow process are needed. This greatly increases production costs. Moreover in conventional designs, the output power from the AWG device is non-uniform (e.g., outer channels/waveguides have higher losses than center channels/waveguides), and therefore, only the center portion of the waveguide array typically can be used if a uniform output is desired. This low efficiency of channel/waveguide usage results in large device size and lower production yield.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an arrayed-waveguide (AWG) device are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Additionally, the illustrations of various embodiments of the invention in the figures are not intended to be necessarily drawn to scale or to exact shapes/contours. As a person skilled in the art can appreciate, the various sizes, shapes, contours, or other characteristics of the various embodiments can vary from one situation to another. Factors such as different designs, manufacturing techniques, materials, and the like can cause such variations.

As an overview, an embodiment of the invention reduces interface loss, diffraction loss, and physical sizes of AWG routers via use of an array of asymmetric waveguide couplers that is inserted between arrayed waveguides. The asymmetric waveguide couplers operate to couple leaked optical power back to the arrayed waveguides. In another embodiment of the invention, a lenslet matrix is used to pre-channel portions of an optical wavefront. The lenslet matrix includes lenslet columns that are aligned with gaps between the arrayed waveguides, such that the portions of the optical wavefront are directed towards the arrayed waveguides rather than towards the gaps.

Figure 1:
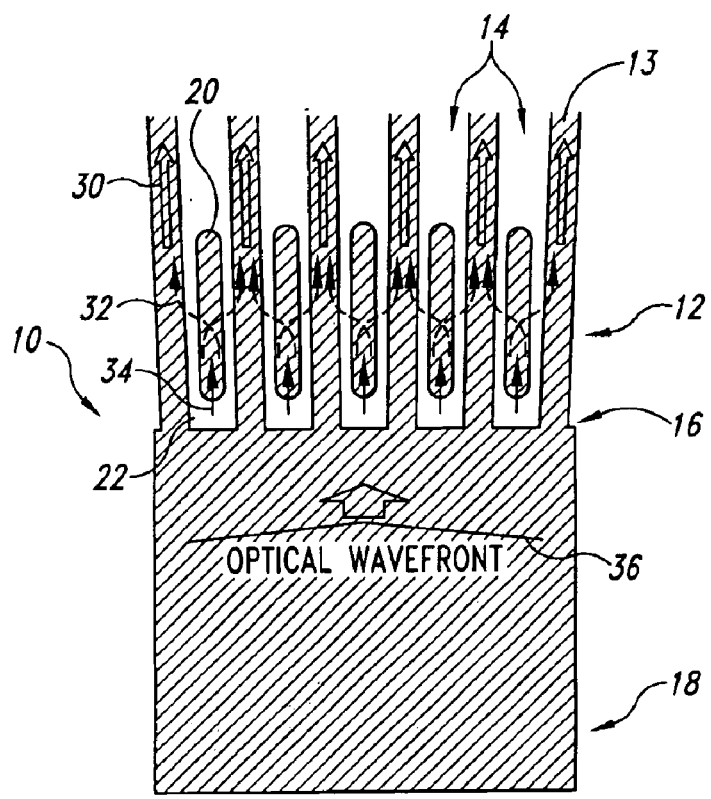
FIG. 1 is a top view of an arrayed waveguide (AWG) device according to an embodiment of the invention.

Referring first to FIG. 1, shown generally at 10 is a top view of an AWG device according to an embodiment of the invention. The AWG device 10 can comprise an optical router, multiplexer, demultiplexer, and the like. The AWG device 10 comprises a plurality of optical waveguides 13 made from standard core material, and which are arranged as an array 12. Gaps 14 between optical waveguides 13 are filled with standard cladding material, and separate the optical waveguides 13. The gaps 14 extend to an interface region 16. A star coupler 18 is coupled to the array 12 of optical waveguides 13 at the interface region 16, with the star coupler 18 being located at an input end of the AWG device 10.

In accordance with an embodiment of the invention, a plurality of insert elements is located adjacent to the interface region 16. In the embodiment shown in FIG. 1, the plurality of insert elements comprises asymmetric waveguide couplers 20 that are inserted (or in otherwise formed) in the gaps 14 between the optical waveguides 13. The asymmetric waveguide couplers 20 can be elongated such that they have cross-sectional areas that increase away from the interface region 16 (e.g., their cross-sectional areas go from narrow to wide, and hence the waveguide couplers 20 are asymmetric in form).

As shown in FIG. 1, each of the asymmetric waveguide couplers 20 is separated from adjacent optical waveguides 13 by cladding material. An embodiment of the AWG device 10 also separates ends of each of the asymmetric waveguide couplers 20 from the interface region 16. The purpose of these separations (shown at 22) will be described later below.

Figure 2:
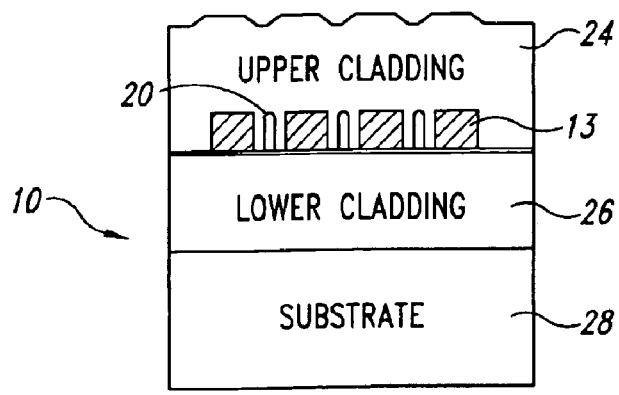
FIG. 2 is a cross-sectional view of the AWG device of FIG. 1.

FIG. 2 is a cross-sectional view of the AWG device 10 of FIG. 1. For simplicity of illustration, the tapering of the asymmetric waveguide couplers 20 is not shown in FIG. 2. The optical waveguides 13 and the asymmetric waveguides couplers 20 are covered at their sides and tops by an upper cladding material 24, and covered at their bottoms by a lower cladding material 26. The lower cladding material 26 is formed over a substrate 28. As shown in FIG. 2, use of the asymmetric waveguide couplers 20 increases the area where light can be coupled to optical waveguides.

In an embodiment, the optical waveguides 13 and the asymmetric waveguide couplers 20 can have roughly rectangular-like shapes, which may be due to a particular fabrication process used to form them, for instance. Ends of the asymmetric waveguide couplers 20 may be rounded, due also to a particular fabrication process used to form them. In an embodiment, the asymmetric waveguide couplers 20 can be formed in the same fabrication process used to form the optical waveguides 13. That is, core material is deposited, and then selected regions are etched away to define the optical waveguides 13 and asymmetric waveguide couplers 20. The regions that are etched away are subsequently filled with cladding material using a deposition/re-flow process.

An example width of the optical waveguides 13 is 6 microns. The asymmetric waveguide couplers 20 can have a width of 4 microns near the interface region 16 and a width of 7 microns away from the interface region 16. The asymmetric waveguide couplers 20 can all have substantially equal lengths in an embodiment, such as lengths from 200–300 microns. The length of the separations 22 (which are filled with cladding material) can be 10 microns. The distance between a particular asymmetric waveguide coupler 20 and an adjacent optical waveguide 13 can be between 4 and 5 microns. It is to be appreciated that these dimensions are approximate, and may vary from one AWG device 10 to another.

Operation of the asymmetric waveguide couplers 20 to reduce interface and diffraction losses is illustrated symbolically in FIG. 1. Guided waves are illustrated by outline arrows 30, coupled-back waves are illustrated by dashed arrows 32, and scattered waves are illustrated by solid arrows 34. With a specific choice of parameters (such as length, width, and geometry of the asymmetric waveguide couplers 20, as well as the length of the separations 22), leaked or scattered optical power is coupled back to the optical waveguides 13 from the asymmetric waveguide couplers 20.

In operation, an optical wavefront 36 propagates through the star coupler 18 and reaches the interface region 16, where the optical wavefront 36 is broken into portions. Some portions proceed in a guided manner through the optical waveguides 13, while other portions are scattered at the interface region 16 and propagate into the separations 22. These scattered portions then propagate from the separations 22 to the asymmetric waveguide couplers 20, and through them.

It is known that the speed of a light signal through a material is dependent on the index of refraction of the material and on the width of the material. Coupling is strongest when speeds of propagating light signals in the optical waveguides 13 and in the asymmetric waveguide couplers 20 are equal. Thus, as the widths of the asymmetric waveguide couplers 20 go from narrow to wide, the speed of the light signals propagating in the asymmetric waveguide couplers 20 go from being very different from speeds of light signals propagating in the optical waveguides 13, to some resonant point where the speeds are equal. Coupling becomes strongest at or near the resonant point, and it is near this resonant point where the portions propagating in the asymmetric waveguide couplers 20 are coupled back towards the optical waveguides 13. The lengths of the asymmetric waveguide couplers 20 can also be chosen (e.g., shortened) such that no (or minimal) reverse coupling (from the optical waveguides 13 to the asymmetric waveguide couplers 20) can occur after the resonant point, when the speeds start to become unequal again.

The purpose of the separations 22 is to provide different indexes of refraction for portions of the optical wavefront 36 that propagate into the optical waveguides 13 and into the asymmetric couplers 20. By providing different indexes of refraction, these portions of the optical wavefront 36 acquire different initial phases. Changing relative phases between light signals allows further optimization of coupling to achieve greater energy transfer, and also reduces reverse coupling.

Another star coupler similar to the star coupler 18 of FIG. 1 can be coupled to an output end of the AWG device 10. At this output star coupler, the asymmetric waveguide couplers 20 modify the output optical field at each optical waveguide 13 to decrease the diffraction loss. The output spectrum is also flattened due to the use of the asymmetric waveguide couplers 20, resulting in the output power being more uniform in each channel, which in turn results in higher channel usage. With this property, smaller-sized designs (approximately 70% of conventional AWG designs, for example) of the AWG device 10 can achieve the same or better performance than conventional AWG designs.

In addition to reducing the interface scattering loss at the input star coupler 18 caused by large gaps 14 between the optical waveguides 13 and in addition to reducing the diffraction loss at the output star coupler, an embodiment of the AWG device 10 can be formed using a shorter and simpler fabrication process. This is because the width of the gaps 14 can remain the same or become larger, since the asymmetric waveguide couplers 20 can be used to "recover" optical power that may otherwise be wasted by scattering. Production costs can be reduced and production yield can be increased by making the AWG device 10 smaller but with a higher channel usage.

Figure 3:
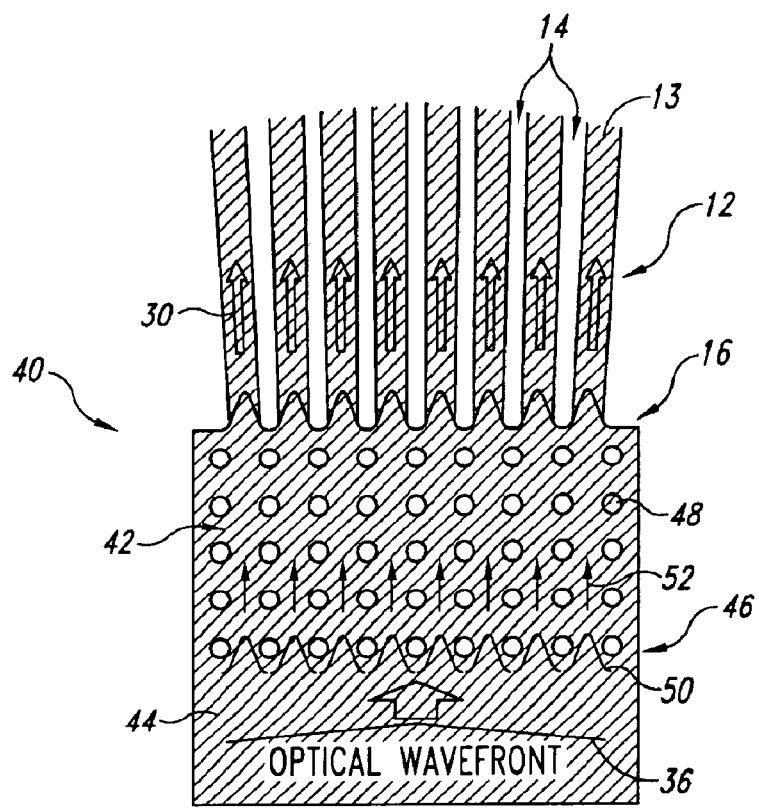
FIG. 3 is a top view of an AWG device according to another embodiment of the invention.

FIG. 3 is a top view of an AWG device 40 according to another embodiment of the invention. Components of the AWG device 40 that are similar to the AWG device 10 of FIG. 1 are labeled similarly. In an embodiment of the AWG device 40, the plurality of insert elements located adjacent to the interface region 16 comprises a lenslet matrix 42 located in a slab waveguide portion 44 of an input end star coupler 46.

The lenslet matrix 42 comprises lenslet columns 48 that are aligned with the gaps 14 between the optical waveguides 13 in the array 12. In an embodiment, the lenslet columns 48 have roughly circular shapes, and can be made of the same cladding material that is present in the gaps 14. The lenslet columns 48 of the lenslet matrix 42 can also be formed in the same deposition/re-flow process used to fill the gaps 14.

Figure 4:
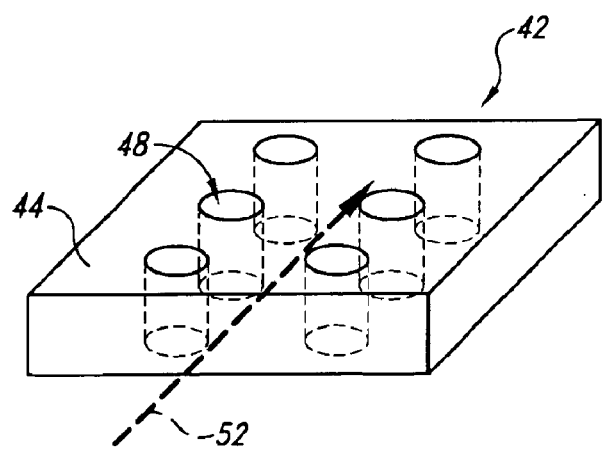
FIG. 4 is a perspective view of a portion of a lenslet matrix for the AWG device of FIG. 3 according to an embodiment of the invention.

FIG. 4 is a perspective view of a portion of an embodiment of (a negative) lenslet matrix 42. As shown symbolically in FIG. 4, each of the lenslet columns 48 can be etched into the slab waveguide portion 44, and then filled with cladding material. In an embodiment, the channels between lenslet columns 48 are aligned to centers of the optical waveguides 13.

With a specific choice of parameters, such as radius of curvature, width, position, number of lenslet columns 48, and distances between them, portions of the optical wavefront 36 can be pre-channeled. An example diameter of the lenslet columns 48 can be 4 microns. The spacing between lenslet columns 48 that are aligned to the gaps 14 can be 10 microns apart, with the channel spacing between the lenslet columns 48 corresponding to the widths of the optical waveguides 13. Again, it is to be appreciated that these dimensions are approximate, and may vary from one AWG device 40 to another.

In an embodiment, the lenslet matrix 42 does not occupy the entire slab waveguide portion 44. For instance, the lenslet matrix 42 may comprise 10 rows of lenslet columns 48 located adjacent to the interface region 16, and thus occupy only a portion of the slab waveguide portion 44. The index of refraction of the lenslet columns 48 is lower then the index of refraction of the surrounding material (e.g., the core material making up the slab waveguide portion 44). This feature causes the lenslet columns 48 to act as defocusing lenses that push light away from them.

In operation, therefore, the lenslet columns 48 of the lenslet matrix 42 pre-channel portions 50 of the optical wavefront 36 towards the optical waveguides 13. That is, prior to the portions' 50 arrival at the interface region 16, the portions 50 propagate through the lenslet matrix 42 as pre-channeled waves 52 that are directed by the lenslet columns 48 towards the optical waveguides 13. Propagation of the pre-channeled wave(s) 52 through the lenslet matrix 42 is also shown in FIG. 4. Because the lenslet columns 48 are aligned to the gaps 14, the portions of the optical wavefront 36 that strike the gaps 14 at the interface region 16 are reduced— the portions 50 are directed towards the optical waveguides 13 rather than towards the gaps 14.

According to an embodiment, the mode of the "virtual" waveguides formed by the lenslet matrix 42 can be designed to match the mode of the array 12 of optical waveguides 13. This matching of modes reduces or eliminates insertion loss. As with the AWG device 10 of FIGS. 1–2, the AWG device 40 of FIG. 3 can also include another star coupler that can be coupled to an output end of the AWG device 40. At this output star coupler, the lenslet matrix 42 modifies the output optical field at each optical waveguide 13 to decrease the diffraction loss. The output spectrum is also flattened due to the use of the lenslet matrix 42, resulting in the output power being more uniform in each channel, which in turn results in higher channel usage. With this property, smaller-sized designs (approximately 50% of conventional AWG designs, for example) of the AWG device 40 can achieve the same or better performance than conventional AWG designs.

In addition to reducing the interface scattering loss at the input star coupler 46 caused by large gaps 14 between the optical waveguides 13 and in addition to reducing the diffraction loss at the output star coupler, an embodiment of the AWG device 40 can be formed using a shorter and simpler fabrication process. This is because the width of the gaps 14 can remain the same or become larger via use of the lenslet matrix 42. Production costs can be reduced and production yield can be increased by making the AWG device 40 smaller but with a higher channel usage.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, while FIGS. 3–4 show substantially circular lenslet columns 48, it is possible to provide other embodiments where the lenslet columns 48 have different shapes, such as elliptical or rectangular. In another embodiment, solid strips or broken strips may be used to define the channels in the lenslet matrix 42, instead of or in addition to using individual lenslet columns 48.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a plurality of optical waveguides arranged in an array;
   a star coupler coupled to the array of optical waveguides at an interface region; and
   a plurality of insert elements located adjacent to the interface region, the plurality of insert elements being positioned to substantially direct portions of an optical wavefront near the interface region to propagate along the optical waveguides.

2. The apparatus of claim 1 wherein the star coupler comprises a first star coupler coupled to an input end of the array of optical waveguides and wherein the interface region comprises a first interface region between the first star coupler and the input end, the apparatus further comprising a second star coupler coupled to an output end of the array of optical waveguides at a second interface region.

3. The apparatus of claim 1 wherein the plurality of insert elements comprises waveguide couplers inserted in gaps between the optical waveguides.

4. The apparatus of claim 3 wherein the waveguide couplers comprise elongated asymmetric waveguide couplers having cross-sectional areas that increase away from the interface region.

5. The apparatus of claim 3 wherein the waveguide couplers comprise waveguide couplers made of a similar material as cores of the optical waveguides.

6. The apparatus of claim 3 wherein ends of the waveguide couplers are separated from the interface region.

7. The apparatus of claim 1 wherein the plurality of insert elements comprises a lenslet matrix located in a slab waveguide portion of the star coupler.

8. The apparatus of claim 7 wherein the lenslet matrix comprises columns aligned with gaps between the optical waveguides in the array to pre-channel the portions of the optical wavefront towards the optical waveguides.

9. The apparatus of claim 7 wherein the columns of the lenslet matrix are made of a cladding material different from a core material of the optical waveguides in the array.

10. An apparatus, comprising:

a plurality of optical waveguides arranged in an array;

a coupler coupled to the array of optical waveguides at an interface region; and a lenslet matrix located in the coupler adjacent to the interface region, the lenslet matrix including lenslet columns positioned to pre-channel portions of an optical wavefront to propagate towards the optical waveguides.

11. The apparatus of claim 10 wherein the coupler comprises a star coupler.

12. The apparatus of claim 10 wherein the lenslet columns of the lenslet matrix are aligned with gaps between the optical waveguides in the array.

13. The apparatus of claim 10 wherein the lenslet columns of the lenslet matrix are made of a cladding material different from a core material of the optical waveguides in the array.

14. An apparatus, comprising:

a plurality of optical waveguides arranged in an array;

a coupler coupled to the array of optical waveguides at an interface region; and a plurality of waveguide couplers inserted in gaps between the optical waveguides and located adjacent to the interface region, the plurality of waveguide couplers being shaped to couple portions of an optical wavefront scattered near the interface region to propagate via the optical waveguides.

15. The apparatus of claim 14 wherein the coupler comprises a star coupler.

16. The apparatus of claim 14 wherein the waveguide couplers comprise elongated asymmetric waveguide couplers having cross-sectional areas that increase away from the interface region.

17. The apparatus of claim 14 wherein the waveguide couplers comprise waveguide couplers made of a similar material as cores of the optical waveguides.

18. The apparatus of claim 14 wherein ends of the waveguide couplers are separated from the interface region.

19. A method, comprising:

receiving an optical wavefront at a coupler; and near an interface region between the coupler and an array of optical waveguides, substantially directing portions of the optical wavefront to propagate along the optical waveguides while reducing portions of the optical wavefront that propagate in gaps between the optical waveguides.

20. The method of claim 19 wherein substantially directing portions of the optical wavefront to propagate along the optical waveguides comprises pre-channeling the optical wavefront to direct the portions of the optical wavefront towards the optical waveguides prior to arrival of the portions at the interface region.

21. The method of claim 19 wherein substantially directing portions of the optical wavefront to propagate along the optical waveguides comprises coupling portions of the optical wavefront that are scattered near the interface propagate in waveguide couplers to propagate via the optical waveguides.

22. The method of claim 21, further comprising providing portions of the optical waveguide that initially propagate in the optical waveguides and that propagate in the waveguide couplers with different initial phases.

23. The method of claim 21, further comprising shaping the waveguide couplers with a cross-section that increases away from the interface region.

24. The method of claim 21 wherein coupling the portions of the optical wavefront to propagate via the optical waveguides includes coupling the portions of the optical wavefront to propagate via the optical waveguides near a resonant point of the waveguide couplers.

* * * * *